United States Patent [19]

Tsuchiya et al.

[11] B 4,011,399
[45] Mar. 8, 1977

[54] PHOTOGRAPHIC IMAGE PICK-UP AND CODING SYSTEM OF RUN-LENGTH TYPE

[75] Inventors: Hiroyoshi Tsuchiya; Yukifumi Tsuda; Heijiro Hayami; Hiroaki Kotera, all of Kawasaki, Japan

[73] Assignee: Matsushita Electric Industrial Co., Ltd., Japan

[22] Filed: Jan. 30, 1974

[21] Appl. No.: 437,986

[44] Published under the second Trial Voluntary Protest Program on April 20, 1976 as document No. B 437,986.

[30] Foreign Application Priority Data

Feb. 1, 1973 Japan .............................. 48-13264

[52] U.S. Cl. ............................................ 358/261

[51] Int. Cl.$^2$ .......................................... H04N 7/12
[58] Field of Search ........................ 178/6, 7.2, 7.6

Primary Examiner—Robert L. Griffin
Assistant Examiner—Edward L. Coles
Attorney, Agent, or Firm—Robert E. Burns; Emmanuel J. Lobato; Bruce L. Adams

[57] ABSTRACT

A photographic image pick-up and coding system of run-length type which includes a correction circuit for preventing erroneous operation of the system even when the system is subjected to unwanted external disturbances such as noises and fluctuations of the voltage of the power source.

2 Claims, 34 Drawing Figures

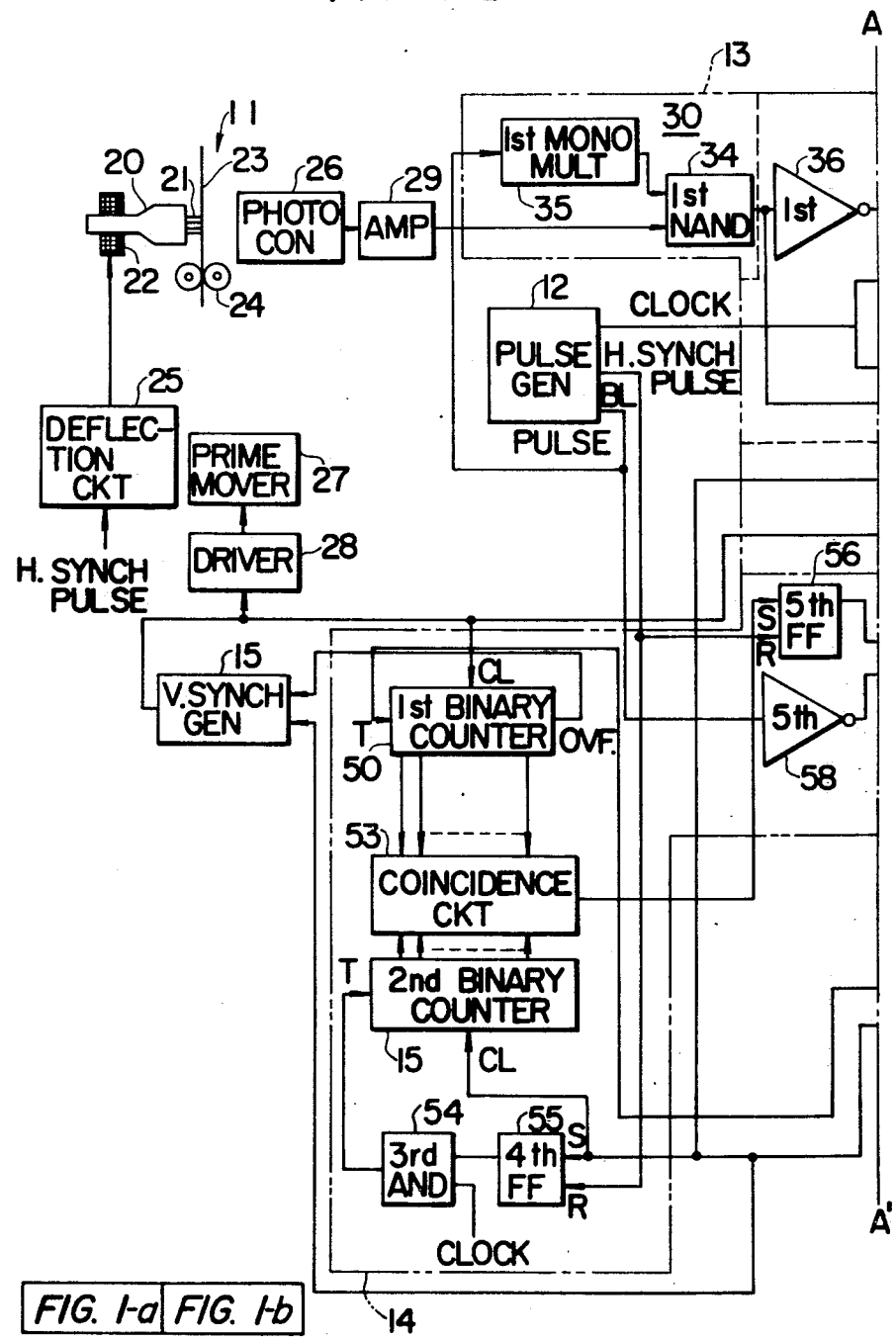
FIG. 1-a

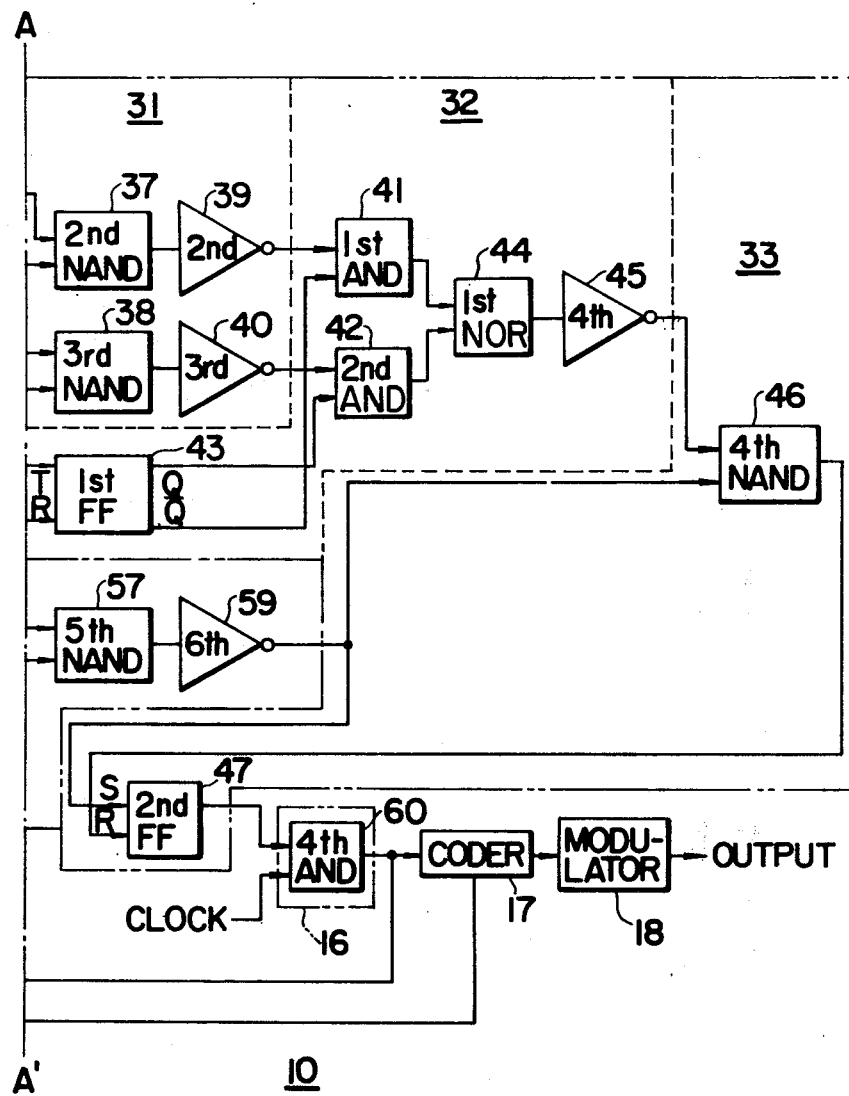

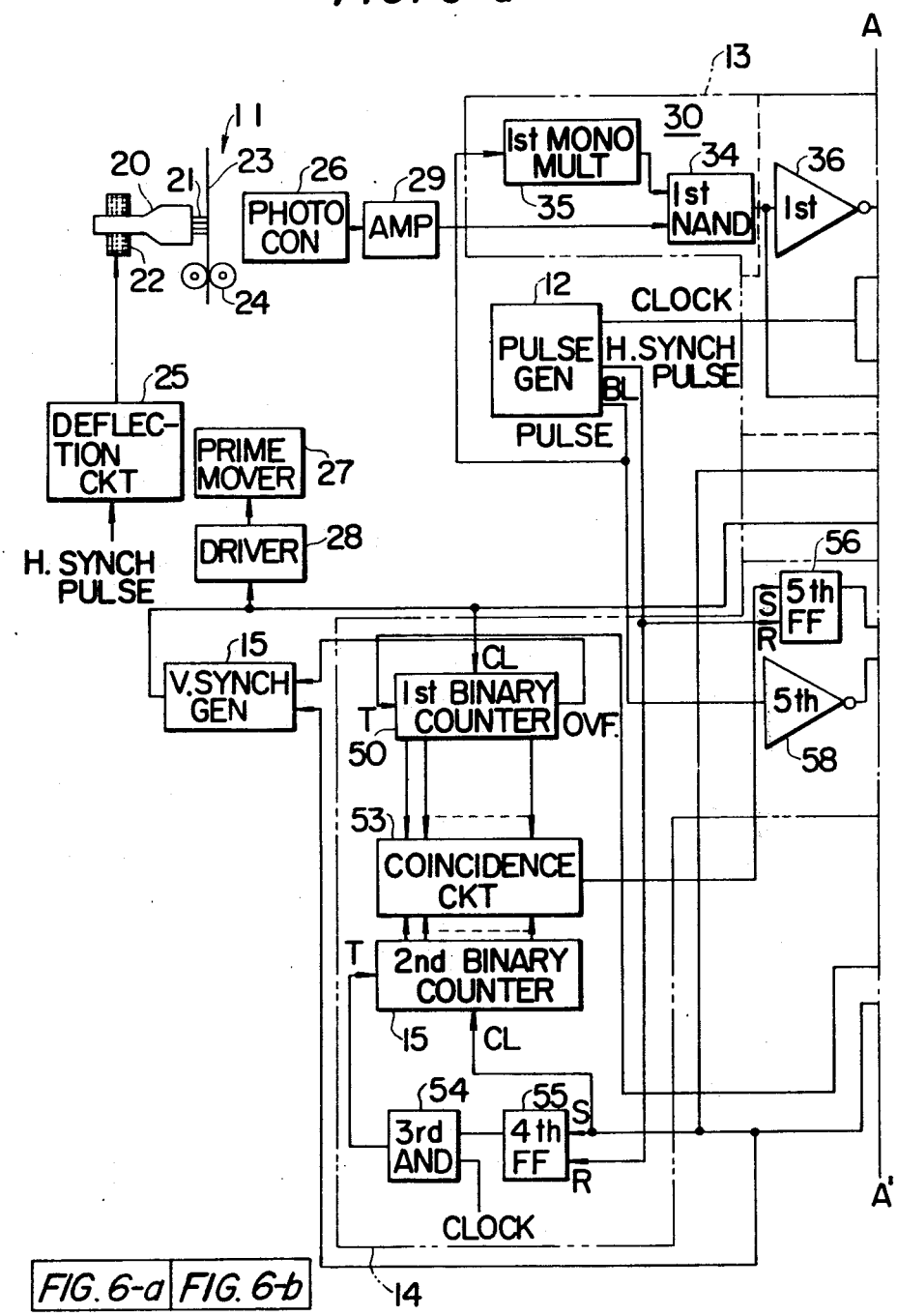
FIG. 6-a

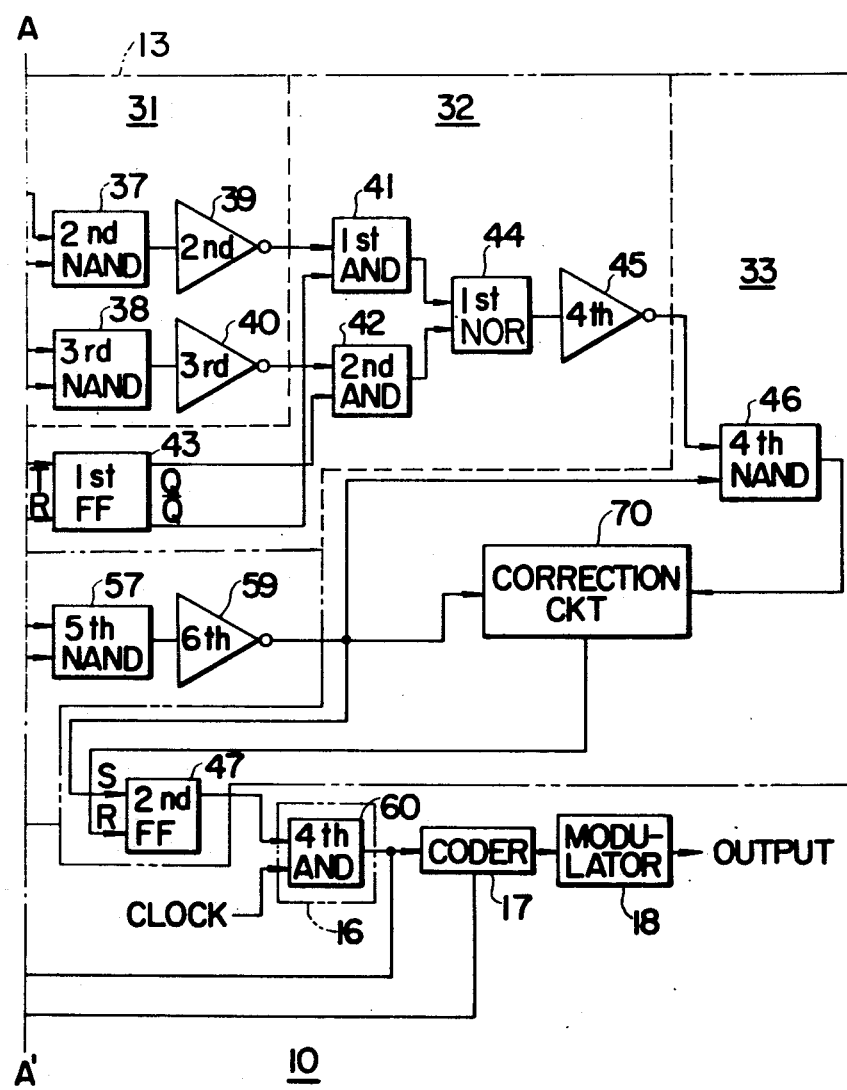
FIG. 6-b

PHOTOGRAPHIC IMAGE PICK-UP AND CODING SYSTEM OF RUN-LENGTH TYPE

The present invention relates to photographic image pick-up and transmission systems and more particularly to a photographic image pick-up and coding system of run-length type.

It has been a problem in conventional image pick-up and transmission systems to minimize the transmission interval of an image signal so as to efficiently utilize the number of transmission channels.

Various signal processing methods for reducing the transmission interval of an image signal are known in the art, one of which is frequency band width compression method. This method includes converting an image signal to be transmitted into multiple digit signal thereby to narrow the width of the frequency spectrum of the signal to be transmitted. Although this method has been recently improved in order to employ for data transmission and facsimile, the method is not fully acceptable.

Another method is a time axis compression method which includes converting an image signal into a code signal of short time. Although this method is capable of reducing the transmission interval better than the frequency band width compression method by removing the redundancy proper to the image signal. However, a system employing this method necessitates a memory of large capacity and is inevitably complicated in construction and costly.

More recently, improved image signal pick-up and transmission systems have been developed which employ the run-length pick-up method. These systems are still not fully acceptable.

It is accordingly a principal object of the present invention to provide an improved run-length image pick-up and transmission system.

It is another object of the invention to provide a run-length image pick-up and transmission system which can correctly operate in spite of unwanted external disturbances or voltage fluctuation of the power source.

These and other objects and the attendant advantages of the invention will become more readily appreciated as the same becomes better understood by reference to the following detailed description when taken in conjunction with the accompanying drawings in which:

FIG. 1 is a schematic block diagram of a photographic image pick-up and transmission system of the present invention.

FIGS. 2A through 2J are waveforms appearing in the system of FIG. 1.

FIG. 6 is a schematic block diagram of another system of the invention.

FIGS. 8A through 8K are waveforms of signals appearing in the system of FIG. 6

Figure 2A:

Referring now to the drawings and more specifically to FIG. 1, there is shown an image pick-up and transmission system 10 according to the invention which generally comprises a facsimile signal generator 11, a pulse signal generator 12 for producing clock pulses, horizontal synchronizing pulse and horizontal blanking pulse signals, a run-length gate controller 13, a start signal generator 14, a vertical synchronizing pulse generator 15, a run-length gate 16, a coder 17, and a modulator 18. The facsimile signal generator 11 includes a flying-spot tube 20 having a fiber optics faceplate 21 and a deflection coil 22. A recording medium 23 carrying a photographic image information is advanced in the close proximity to the front end of the faceplate 21 by means of a feeding means 24 such as a pair of rollers. The flying-spot tube 20 produces at the faceplate 21 a flying-spot, or a moving light spot, which sweeps in one direction in synchronism with the horizontal pulse signal applied from the pulse generator 12 to a deflection circuit 25 connected to the deflection coil 22. The flying-spot is irradiated onto the recording medium 23 with the result that the intensity of the flying-spot is modulated by the photographic image information on the recording medium 23. The modulated flying-spot is picked up and converted into an electric signal or a facsimile signal by a photo-electric converter 26 positioned in the vicinity of the faceplate 21. The feeding means 24 is, on the other hand, occasionally driven by a prime mover 27 so that the recording medium 23 is advanced in a vertical direction perpendicular to the scanning direction of the flying-spot, whereby the recording medium 23 is consecutively scanned by the flying-spot and the image information is desiredly picked up. The prime mover 27 is controlled by a driver 28 which receives a vertical synchronizing pulse signal from the vertical synchronizing pulse generator 15. The facsimile signal from the converter 26 is amplified by an amplifier 29.

The run-length gate controller 13 generally includes a space signal superposer 30 for superposing a space signal at the leading portion of the facsimile signal delivered from the facsimile signal generator 11, a sampler 31 for sampling the facsimile signal with the clock pulses, a mark-space selector 32 for selectively passing therethrough one of the sampled mark and space signals, a run-length gate pulse generator 33 for producing run-length gate pulses in accordance with the one of the sampled mark and space signals passed through the selector 32 and the start signal from the start signal generator 14. The space signal superposer 30 includes a first NAND gate 34 having one input connected to the output of the amplifier 29. The other input of the NAND gate 34 is connected to an output of a monostable multivibrator 35 which turns to a quasi-stable state for a certain time period when triggered by the blanking pulse signal from the pulse generator 12. The sampler 31 includes a first inverter 36 having an input connected to an output of the first NAND gate 34. An output of the inverter 36 is connected to one input of a second NAND gate 37. The output of the first NAND gate 34 is also connected to one input of a third NAND gate 38. The other input of both the NAND gates 37 and 38 is connected to a clock pulse terminal of the pulse generator 12. Outputs of the NAND gates are respectively connected to inputs of second and third inverters 39 and 40. The mark-space selector 32 includes first and second AND gates 41 and 42. The first AND gate 41 has one input connected to an output of the inverter 39 and the other input connected to a $\bar{Q}$ terminal of a first flip-flop circuit 43. The second AND gate 41 has one input connected to an output of the third inverter 40 and the other input connected to a Q terminal of the flip-flop circuit 43. The first flip-flop circuit 43 is triggered by a coding completion signal from the coder 17 and reset by the vertical synchronizing pulse from the generator 15. Outputs of the first and second AND gates 41 and 42 are connected to both inputs of a NOR gate 44 which has an output connected to an input of a fourth inverter 45. The ren-length gate pulse generator 33 includes a NAND gate 46 and a second flip-flop circuit 47. The NAND gate 46 has one input connected to an output of the inverter 45 and an output connected to the reset terminal of the flip-flop circuit 47. The other input of the NAND gate 46 and the set terminal of the flip-flop circuit 47 are connected to the output of the start pulse generator 14.

The start pulse generator 14 includes first and second binary counters 50 and 51. The first binary counter 50 has a trigger terminal connected to the output of the run-length gate 16 and a clear terminal connected to the output of the vertical synchronizing pulse generator 15, an overflow terminal connected to one input of the pulse generator 15, and a number of digit output terminals connected to one side input terminals of a coincidence circuit 53. The second binary counter 51 has a trigger terminal connected to an output of a third AND gate 54, a clear terminal connected to the code completion signal terminal of the coder 17 and a number of digit output terminal connected to the other side input terminals of the coincidence circuit 53. The third AND gate 54 has one input connected to the clock pulse terminal of the pulse generator 12 and other input connected to Q terminal of a fourth flip-flop circuit 55. The flip-flop circuit 55 has the set terminal connected to the coding completion signal terminal of the coder 17 and the reset terminal connected to the horizontal synchronizing pulse terminal of the pulse generator 12. An output of the coincidence circuit 53 is connected to the trigger terminal of a fifth flip-flop circuit 56, the reset terminal of which is connected to the horizontal synchronizing pulse terminal of the pulse generator 12. The Q terminal of the flip-flop circuit 56 is connected to one input of a fifth NAND gate 57, the other input of which is connected to an output of a fifth inverter 58. The inverter 58 has an input connected to the blanking pulse terminal of the pulse generator 12. An output of the NAND gate 57 is connected to an input of a sixth inverter 59 which has an output serves as the output of the start pulse generator 14.

The run-length gate 16 includes a fourth AND gate 60 having one input connected to the clock pulse terminal of the pulse generator 12 and other input connected to the output terminal of the second flip-flop circuit 47. An output of the fourth AND gate 60 serves as the output terminal of the run-length gate 16. The output terminal of the gate 16 is connected to the coder 17 which produces a code completion signal on the code completion terminal. The output terminal of the coder 17 is connected to the modulator 18 which modulate the coded signal by a carrier signal.

Figure 2B:
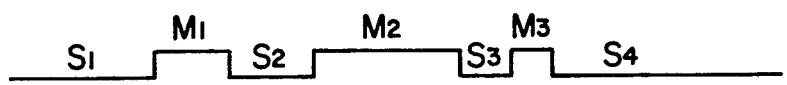
Figure 2C:
Figure 2D:
Figure 2E:

When, in operation, the pulse generator 12 produces on the clock pulse signal terminal the clock pulse signal as shown in FIG. 2A. The repetition rate of the clock pulse signal is so selected as to correspond to the desired horizontal largeness of the picture element of the image information. The facsimile signal generator 11, on the other hand, produces a facsimile signal as shown in FIG. 2B. The facsimile signal consists of space signals $S_1$, $S_2$, $S_3$ and $S_4$, and mark signals $M_1$, $M_2$ and $M_3$. The fascimile signal is applied to one input of the first NAND gate 34. The monostable multivibrator 35 produces a short mark signal at the leading portion of the facsimile signal. the mark signal is coupled by the NAND gate 34 with the facsimile signal whereby the leading portion of facsimile signal is forced to be space. The facsimile signal is inverted by the NAND gate 34 and applied through the inverter 36 to one input of the NAND gate 37 and direct to the NAND gate 38. The NAND gates 37 and 38 couples the applied facsimile signal with the clock pulse signal so as to sample the facsimile signal with the clock pulse signal, whereby such pulse signals as shown in FIGS. 2C and 2D appear on the outputs of the NAND gates 37 and 38, respectively. The sampled signals are inverted by the inverters 39 and 40, respectively. The flip-flop circuit 43 is triggered by the coding completion signal from the coder 17 and reset by the vertical synchronizing pulse signal, and produces a logical 1 signal on the Q terminal and a logical 0 signal on the Q terminal when one out of the mark signals of the facsimile signal is to be coded and a logical 0 signal on the Q terminal and a logical 1 signal on the $\bar{Q}$ terminal when one of the space signals is to be coded. When, in this instance, one of the mark signals is to be coded, only the second AND gate passes therethrough the sampled space signal as shown in FIG. 2E. The sampled space signal passed through the NOR gate 44 and the inverter 45 and applied to the one input of the fourth NAND gate 46.

Figure 2F:
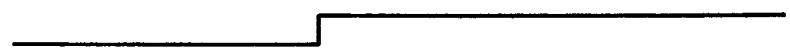
Figure 2G:
Figure 2H:
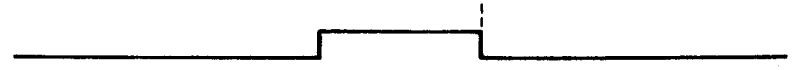
Figure 2J:

The first binary counter 50, on the other hand, counters and stores the number of clock pulses passed through the run-length gate 60 until the counter 50 is cleared by the vertical synchronizing pulse. Namely, the binary counter 50 memorizes the trailing point of the last coded mark or space signal on the recording medium 23. The binary counter 50 is overflowed, an 1-H information sampling completion signal appears at the overflow terminal of the counter 50. The capacity of the counter 50 is so selected the counter is overflowed when the counter 50 counts the number of clock pulses equal to that of the picture elements along one horizontal line. The fourth flip-flop circuit 55 is set by the coding completion signal from the coder 17 to thereby produce a logical 1 signal on the output, which is applied to one input of the AND gate 54. The AND gate then passed therethrough the clock pulse signal which is applied to the trigger terminal of the second binary counter 51. The counter 51 then counts the number of the clock pulses until the fourth flip-flop circuit 55 is reset by the horizontal synchronizing pulse. When the number of the clock pulses counted by the second binary counter 51 coincide with that of the first binary counter 50, the coincidence circuit 53 produces a logical 1 signal, that is a coincidence signal, which is applied to the set terminal of the fifth flip-flop circuit 56, which then produces a logical 1 signal which is applied to the fifth NAND gate 57. As long as the horizontal blanking pulse does not appear, the NAND gate 57 produces a logical 0 signal which is inverted by the inverter 59 into a logical 1 signal, that is the start signal, as shown in FIG. 2F. The start signal is applied to the set terminal of the flip-flop circuit 47 and to the other input of the NAND gate 46. Therefore, on the output of the NAND gate 46 appears a signal as shown in FIG. 2G, the leading edge of the first of which signal resets the flip-flop circuit 47. The flip-flop circuit 47 then produces a run-length gate control pulse as shown in FIG. 2H. The run-length gate control pulse is applied to one input of the AND gate 60 which then passes therethrough during the pulse width of the run-length gate control pulse the clock pulses as shown in FIG. 2J. Namely, the mark signal $M_2$ is sampled with the clock pulses. The sampled signal from the AND gate 60 is coded by the coder 17 and then modulated by the modulator 18.

Referring now to FIGS. 3A, 3B, 4A, 4B and 4C, the operation of the system of FIG. 1 is further explained hereinbelow.

Figure 3A:
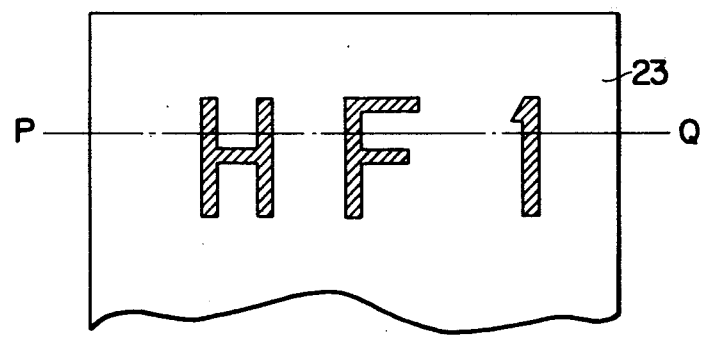
FIG. 3A is a diagram showing an example of recording medium carrying thereon a photographic image information to be picked up.
Figure 3B:
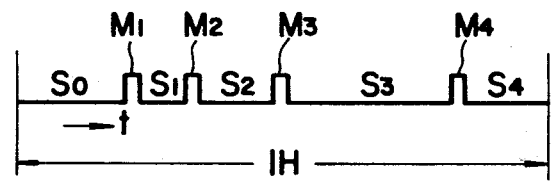
FIG. 3B is a waveform of a facsimile signal representing the image information carried by the recording medium shown in FIG. 3A.
Figure 4A:
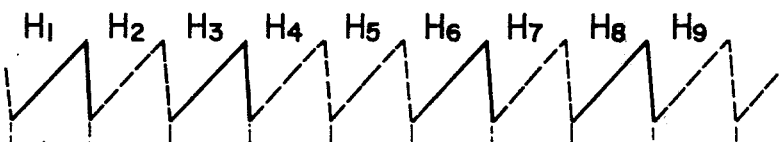
FIGS. 4A through 4C are waveforms appearing in the system of FIG. 1 when the recording medium shown in FIG. 3A is employed in the system.
Figure 4B:
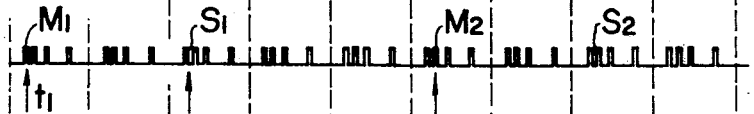
Figure 4C:
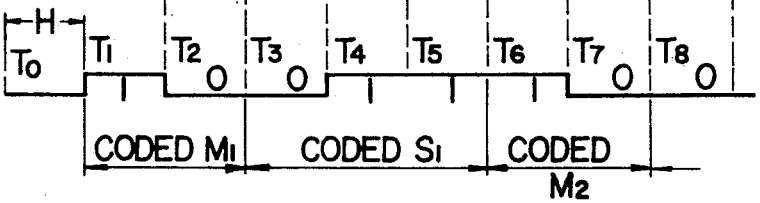

When, for example, the recording medium 23 carries such photographic information as shown in FIG. 3A, the facsimile signal from the generator 11 has a waveform as shown in FIG. 3B. The deflection coil of the flying-spot tube is energized by the deflectiom signal as shown in FIG. 4A, so that the facsimile signal shown in FIG. 3B repeatedly appears as shown in FIG. 4B. When, for example, the mark signal $M_1$ is to be coded, the mark signal $M_1$ is sampled with the clock pulses by the run-length gate 16. The sampled mark signal $M_1$ is applied to the coder 17 which then produces coded signal $M_1$ from a moment $T_1$ to another moment $T_3$ in FIG. 4C. The coder is adapted to produce the coding completion signal at a moment $t_2$ one digit before the moment when the coding is finished. The coder 17 therefore receives the sampled succeeding space signal $S_1$ from the run-length gate 16 during the time interval from the moment $T_2$ to $T_3$. The coder 17 produces the coded $S_1$ signal from the moment $T_3$ to $T_6$. When the coding of the space signal $S_4$ is completed, the coder 17 produces the coding completion signal. At the same time, the first binary counter 50 produces the 1-H information sampling completion signal on the overflow terminal thereof. The coding completion signal and the 1-H information sampling completion signal are delivered to the vertical synchronizing pulse generator 15 which then produces the vertical synchronizing pulse signal on the output thereof. The vertical synchronizing pulse signal energizes the driver 28 which accordingly energizes the prime mover 27. The energized prime mover 27 actuates the feeding means 24 which then feeds the recording medium by a predetermined length corresponding to the vertical length of one picture element of the information on the recording medium 23. Thereupon, the overall system repeats the same operation as above-mentioned so as to pick up another part of the image information lying on the succeeding horizontal line.

Since, apparently, the invention system repeatedly scans the recording medium with the flying-spot along the same horizontal scanning line pending the completion of coding image information on the horizontal scanning line, the invention system is simple in construction and unnecessitates costly memory means.

It is a problem that the above-stated system is liable to erroneously operate due to unwanted external disturbances, as mentioned hereinbelow.

Figure 5A:
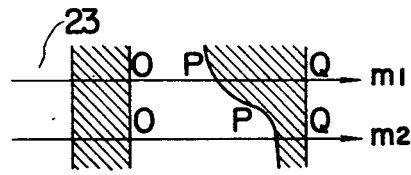
FIG. 5A is a diagram showing deviation of scanning lines on the recording medium.
Figure 5B:
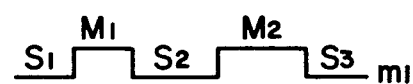
FIG. 5B is a waveform of a facsimile signal when the recording medium is scanned along the scanning line $m_1$.
Figure 5C:
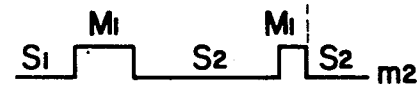
FIG. 5C is a waveform of a facsimile signal when the recording medium is scanned along the scanning line $m_2$ in FIG. 5A.
Figure 5D:
FIGS. 5D and 5E are waveforms of signals appearing in the system of FIG. 1 when the facsimile signals of FIGS. 5B and 5C are consecutively produced in the system of FIG. 1.
Figure 5E:

FIG. 5A shows a portion of a recording medium on which graphic image information as indicated by hatchings. When, for example, the recording medium is firstly scanned with the flying-spot along a scanning line $m_1$, a facsimile signal having a wave-form as shown in FIG. 5B is produces by the facsimile signal generator 11. If the succeeding scanning is performed along another scanning line $m_2$ due to the external disturbances such as fluctuation of the voltage of the electric power source, then the facsimile signal has a waveform as shown in FIG. 5C. Since, in this instance, the start signal from the start signal generator 14 rises up as shown in FIG. 5D, the run-length gate control signal has a waveform as shown in FIG. 5E. In this case, the system apparently erroneously operates.

In order to solve the above-stated problem encountered in the system of FIG. 1, an improved image pickup and transmission system is provided according to the invention, which is shown in FIG. 6. The particular system comprises the same construction as that of FIG. 1 except that the run-length gate controller 13 further comprises a correction circuit 70 interposed between the fourth NAND gate 46 and the second flip-flop circuit 47.

Figure 7:
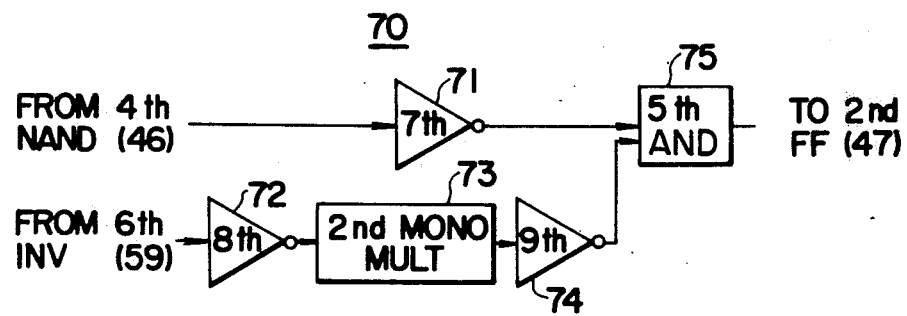
FIG. 7 is a block diagram of a portion of the system of FIG. 6.

FIG. 7, there is illustrated a preferred embodiment of the correction circuit which includes a seventh inverter 71 having an input terminal connected to the output terminal of the fourth NAND gate 46 and an eigth inverter 72 having an input terminal connected to the output terminal of the sixth inverter 59. The output terminal of the eigth inverter 72 is connected to an input terminal of a second monostable multivibrator 73 which is in a quasi-stable state during a preselected duration slightly longer than the repetition rate of the clock pulse train, when it is triggered by a pulse. The output terminal of the monostable multivibrator 73 is connected to an input terminal of a ninth inverter 74. The output terminals of the seventh and ninth inverter 71 and 74 are connected to input terminals of a fifth NAND gate 75 which has an output terminals connected to the reset terminal of the flip-flop circuit 47.

Figure 8A:

Referring now to FIGS. 8A and 'L, the operation of the correction circuit 70 of FIG. 7 is explained hereinbelow.

Figure 8B:
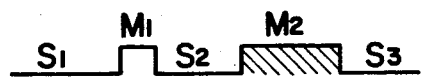
Figure 8C:
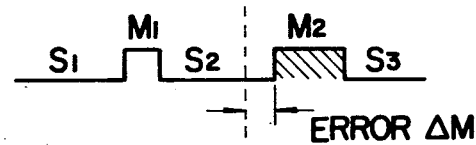
Figure 8D:
Figure 8E:
Figure 8F:
Figure 8G:
Figure 8H:
Figure 8J:
Figure 8K:

FIG. 8A shows waveforms of the clock pulses generated by the pulse generator 12. It is, in this instance, assumed that two successive facsimile signals generated by the facsimile signal generator 11 have such waveforms as shown in FIGS. 8B and 8C. As shown in FIGS. 8B and 8C, the two successive facsimile signals contain space signals $S_1$, $S_2$ and $S_3$, and mark signals $M_1$ and $M_2$. It is is also assumed that the succeeding facsimile signal is erroneous in that the mark signal $M_2$ indicated by hatchings of the succeeding facsimile signal is shorter than that of the former by an error period $\Delta M$ as shown in FIG. 8C. When the mark signal $M_2$ is now to be coded, the sampled signal appearing at the output terminal of the NAND gate 46 has a waveform as shown in FIG. 8D and a start signal from the start signal generator 14 has, on the other hand, such a waveform as shown in FIG. 8E. The sampled signal from the NAND gate 46 is applied to the seventh inverter 71 which produces a signal having such a waveform as shown in FIG. 8F. The start signal from the start signal generator 14 is applied through the eigth inverter 72 to the second monostable multivibrator 73 which then produces a pulse having such a waveform as shown in FIG. 8G. The pulse signal is inverted by the ninth inverter 74 into a pulse having such a waveform as shown in FIG. 8H. The pulses of FIGS. 8F and 8H are applied to the NAND gate 75 which then produces a pulse train having such a waveform as shown in FIG. 8J. Thus, the second flip-flop circuit 47 produces such a pulse as shown in FIG. 8K. 8K, which is applied to the other input of the NAND gate 84. Hence, the first pulse of the signal from the NAND gate 46 is blocked by the NAND gate 84 and a pulse signal having a waveform of FIG. 8L appears at the output of the NAND gate 84, which is applied to the second flip-flop circuit 47. The second flip-flop circuit 47 therefore produces a run-length gate pulse having a waveform as shown in FIG. 8M.

Being apparent from the above description, the system of FIG. 6 including the correction circuit 70 regards the error period ΔM as a mark or space signal of one picture element when the period ΔM is equal to or larger than two picture element. When the error period ΔM is smaller than two picture element, the system of FIG. 6 neglects the error period ΔM. It may be understandable that the deviation of the scanning line of the flying-spot is most important when an edge portion of a graphic pattern, character or the like on the recording medium. In this case, the system of FIG. 6 represents the edge portion by alternate mark and space lines of one picture element length, namely, a broken line.

It should be apparent from the above detailed description that an improved image pick-up and transmission system has been provided. The described system is simple and economical.

It will be understood that the invention is not to be limited to the exact construction shown and described and that various changes and modifications may be made without departing from the spirit and scope of the invention, as defined in the appended claims.

What is claimed is:

1. A photographic image information pick-up and coding system for picking up and coding photographic image information carried on a recording medium, which comprises:

a record medium having photographic image information thereon;

a facsimile signal generator (11) including scanning means for repeatedly producing facsimile signals representing a part of said image information lying on a horizontal scanning line, each of said facsimile signals including at least one space signal;

a pulse generator (12) for producing a clock pulse signal consisting of clock pulses consecutively appearing at a constant rate and a blanking pulse signal consisting of blanking pulses appearing during the blanking period between two consecutive facsimile signals;

a run-length gate (16) for passing therethrough said clock pulse signal during a time period that a run-length gate trigger pulse lasts;

a start signal generator (14) for producing a start signal;

a run-length gate controller (13) for producing said run-length gate trigger pulse in accordance with said facsimile signals, clock pulse signal and blanking pulse signal, said run-length gate controller including a space signal superposer for superposing a space signal on a leading edge of each of said facsimile signals, a sampling circuit for sampling said mark and space signals with said clock pulse signal, a mark-space selector (32) triggered by said start signal for selectively passing therethrough one of the sampled mark and space signals, and run-length trigger pulse generating means for producing said run-length trigger pulse generating means for producing said run-length gate trigger pulse, said run-length gate trigger pulse rising at the rise of said start signal and decaying at the rise of the first pulse of the sampled one signal passed through said mark-space selector, said run-length gate trigger pulse generating means including a first gate (46) for passing therethrough said one of the sampled mark and space signals from said mark-space selector when triggered by said start signal, an error eliminating pulse generator (72, 73, 74) connected to the output of said first gate for producing an error eliminating pulse lasting from the rise of said start signal for a predetermined duration slightly longer than the repetition rate of said clock pulse train, a second gate (75) connected to the output of said first gate for allowing pulses from said first gate to pass therethrough while preventing said pulses from passing therethrough when energized by an error eliminating pulse, and a flip-flop circuit for producing said run-length gate trigger pulse rising at the rise of said start signal and decaying at the rise of the leading pulse of the pulses from said second gate; and a coder (17) for coding the clock pulse passed through said run-length gate.

2. A photographic image information pick-up and coding system as claimed in claim 1, in which said error eliminating pulse generator includes a monostable multivibrator in a quasi-stable state during a period slightly longer than the repetition rate of said clock pulse signal.

* * * * *